United States Patent [19]

Ito et al.

[11] 4,282,114

[45] Aug. 4, 1981

[54] CATALYST FOR POLYMERIZING α-OLEFINS

[75] Inventors: Akira Ito, Yokohama; Heizo Sasaki, Tokyo; Masanori Osawa, Yokohama; Masahiro Kouno, Manazuru; Kenji Iwata, Yokohama, all of Japan

[73] Assignee: Mitsui Toatsu Chemicals, Inc., Tokyo, Japan

[21] Appl. No.: 116,206

[22] Filed: Jan. 28, 1980

[30] Foreign Application Priority Data

Feb. 8, 1979 [JP] Japan .................................. 54/12769
Jun. 4, 1979 [JP] Japan .................................. 54/68860

[51] Int. Cl.$^3$ ............................................... C08F 4/64
[52] U.S. Cl. ................................ 252/429 B; 526/125
[58] Field of Search ................................ 252/429 B

[56] References Cited

U.S. PATENT DOCUMENTS

| | | | |
|---|---|---|---|
| 3,365,434 | 1/1968 | Coover et al. | 252/429 B X |
| 4,142,991 | 3/1979 | Arzoumanidis et al. | 252/429 B |
| 4,175,171 | 11/1979 | Ito et al. | 252/429 B X |
| 4,187,196 | 2/1980 | Giannini et al. | 252/429 B |

FOREIGN PATENT DOCUMENTS 50-126590 10/1975 Japan .
1335887 10/1973 United Kingdom .

*Primary Examiner*—Patrick Garvin
*Attorney, Agent, or Firm*—Lane, Aitken, Ziems, Kice & Kananen

[57] ABSTRACT

Disclosed is a catalyst for polymerizing α-olefins which comprises
(A) a composition obtained by co-comminuting
  (a) a magnesium halide,
  (b) an organic acid ester,
  (c) a halogenated aliphatic or alicyclic hydrocarbon,
  (d) at least one ingredient selected from the group consisting of aliphatic hydrocarbons, alicyclic hydrocarbons, aromatic hydrocarbons, halogenated aromatic hydrocarbons, liquid propylene oligomers and aromatic ethers, and
  (e) an aluminum halide optionally added thereto and then heat-treating the resulting mixture together with titanium tetrachloride;
(B) an organic aluminum compound; and
(C) an organic acid ester or a complex thereof with an aluminum halide.

4 Claims, No Drawings

CATALYST FOR POLYMERIZING α-OLEFINS

BACKGROUND OF THE INVENTION (1) Field of the Invention

The present invention relates to a catalyst for polymerizing α-olefins with which poly-α-olefins having a high degree of stereoregularity are produced with the aid of the catalyst comprising a titanium component of the so-called carrier type and an organic aluminum compound.

(2) Description of the Prior Art

Recently, a method for improving the activity of a Ziegler-Natta catalyst by supporting its titanium component on a carrier has been developed. One example of the prior art concerned therewith is proposed in Japanese Laid-Open Patent Publication No. 9342/72 which discloses a method for improving the stereoregularity of the resulting polymer by adding an electron donative compound as the third component to a combination of a carrier type titanium component (composed of a titanium compound supported on a magnesium halide) and an organic aluminum compound.

However, if propylene is polymerized in the presence of such a conventional two-component catalyst comprising a carrier type titanium component and an organic aluminum compound, the crystallinity of the resulting polymer is extremely low despite the high polymerization activity of the catalyst. Although the crystallinity of the resulting polymer is improved by adding an electron donative compound to the catalyst, the polymerization activity of the catalyst is remarkably lowered. Moreover, the effect of improving the crystallinity of the resulting polymer is not satisfactory because it is difficult to produce crystalline polypropylene which is equal in quality to that obtained with the aid of a catalyst (for example, a titanium trichloridediethylaluminum monochloride catalyst) in current use for industrial purposes.

In the process disclosed in Japanese Laid-Open Patent Publication No. 126590/75, there is proposed a catalyst composed of a composition obtained by reacting a co-comminuted mixture of a magnesium halide and an organic acid ester with titanium tetrachloride; an organic aluminum compound; and an organic acid ester. However, this catalyst is unsatisfactory from the viewpoints of both its polymerization activity and the crystallinity of the resulting polymer.

SUMMARY OF THE INVENTION

The present invention is directed to improvements in the performance of such carrier type catalysts. First of all, it has been found that the use of a composition obtained by co-comminuting a magnesium halide, an organic acid ester and a halogenated aliphatic or alicyclic hydrocarbon and then heat-treating the resulting mixture together with titanium tetrachloride brings about a marked increase in polymerization activity as compared with the use of the composition of Japanese Laid-Open Patent Publication No. 126590/75 as the titanium component. In spite of the increased polymerization activity, the performance of catalysts so prepared is not satisfactory for the polymerization of α-olefins because the crystallinity and bulk density of the resulting polymer are low. Thus, we have made a study of such catalysts with a view to enhancing the crystallinity and bulk density of the resulting polymer, and have found that these parameters are greatly improved by carrying out the aforesaid co-comminuting operation in the presence of various organic compounds. The present invention has been completed on the basis of this discovery.

The catalysts so prepared are desirable because both their polymerization activity and the crystallinity of the resulting polymer are high. However, it may happen that the co-comminuted mixture agglomerates to form a mass if large amounts of raw materials are charged into a pulverizer and that coarse particle in the resulting polymer increases. In order to overcome these difficulties, an aluminum halide may optionally be added to the co-comminuted mixture of a magnesium halide and other ingredients.

Thus, the present invention provides a catalyst having outstandingly high performance in the polymerization of α-olefins, the catalyst being composed of (A) a composition obtained by co-comminuting
  (a) a magnesium halide,
  (b) an organic acid ester,
  (c) a halogenated aliphatic or alicyclic hydrocarbon,
  (d) at least one ingredient selected from the group consisting of aliphatic hydrocarbons, alicyclic hydrocarbons, aromatic hydrocarbons, halogenated aromatic hydrocarbons, liquid propylene oligomers and aromatic ethers, and
  (e) an aluminum halide optionally added thereto and then heat-treating the resulting mixture together with titanium tetrachloride;

(B) an organic aluminum compound; and (C) an organic acid ester or a complex thereof with an aluminum halide.

DETAILED DESCRIPTION OF THE PREFERRED EMBODIMENTS

The magnesium halide used as the ingredient (a) in the preparation of the component (A) of the present catalyst may be any magnesium halide that is in a substantially anhydrous state. Among others, anhydrous magnesium chloride is preferred.

The organic acid ester used as the ingredient (b) is an aromatic, aliphatic or alicyclic carboxylic acid ester of the formula $R^2COOR^1$ 

wherein $R^1$ is an aromatic, aliphatic or alicyclic hydrocarbon radical of 1 to 12 carbon atoms and $R^2$ is the same as $R^1$ or

Specific examples thereof include methyl benzoate, ethyl benzoate, propyl benzoate, phenyl benzoate, ethyl toluate, ethyl anisate, ethyl naphthoate, ethyl acetate, n-butyl acetate, ethyl methacrylate, ethyl hexahydrobenzoate and the like.

The halogenated aliphatic or alicyclic hydrocarbon used as the ingredient (c) is a saturated or unsaturated hydrocarbon having one or more halogen substituents. Specific examples thereof include methylene chloride, chloroform, carbon tetrachloride, ethylene dichloride, n-butyl chloride, propenyl chloride, 1,2-dichloropropane, 1,2-dichloroethylene, hexachloroethane, tetrachloroethylene, tetrabromoethane, chlorinated paraffin and the like.

The organic compound used as the ingredient (d) is selected from any of the following three groups:

(1) Saturated aliphatic hydrocarbons such as n-hexane, n-heptane, n-octane, isooctane, etc.; unsaturated aliphatic hydrocarbons such as pentene-1, hexene-1, octene-1, etc.; aromatic hydrocarbons such as benzene, toluene, ethylbenzene, o-xylene, m-xylene, p-xylene, etc.; alicyclic hydrocarbons such as cyclohexane, cyclopentane, etc.; and halogenated aromatic hydrocarbons such as monochlorobenzene, o-dichlorobenzene, m-dichlorobenzene, etc.

(2) Somewhat viscous liquid propylene oligomers having a molecular weight of the order of 100 to 1500 and preferably 200 to 1000. Such propylene oligomers can be prepared by any conventional procedure (for example, by polymerizing propylene with the aid of a catalyst such as aluminum chloride or the like).

(3) Aromatic ethers such as methyl phenyl ether, ethyl phenyl ether, allyl phenyl ether, diphenyl ether, ditolyl ether, etc.

Among the foregoing compounds, those belonging to the group (3) are particularly preferred from the viewpoint of the crystallinity and bulk density of the resulting polymer.

The aluminum halide used as the ingredient (e) may be any aluminum halide that is in a substantially anhydrous state. Among others, aluminum chloride and aluminum bromide are preferred.

In the preparation of the component (A), the ingredients (a), (b), (c), (d) and optionally (e) are first co-comminuted according to any well-known method that is commonly used in the preparation of the titanium component of a Ziegler-Natta catalyst. For example, the co-comminuting operation is carried out at a temperature of 0° to 80° C. for a period of 1 to 100 hours in a vacuum or in an inert atmosphere. This should be done in a state where moisture, oxygen and the like are almost completely removed.

On the occasion of the co-comminution, the ingredient (a) is used in an amount of 50 to 95 wt.%, preferably 55 to 90 wt.% and more preferably 60 to 80 wt.%; the ingredient (b) in an amount of 1 to 40 wt.%, preferably 2 to 30 wt.% and more preferably 3 to 20 wt.%; the ingredient (c) in an amount of 1 to 40 wt.%, preferably 2 to 30 wt.% and more preferably 3 to 20 wt.%; the ingredient (d) in an amount of 1 to 40 wt.%, preferably 2 to 30 wt.% and more preferably 3 to 25 wt.%; and the ingredient (e) in an amount of 0.1 to 10 wt.%, preferably 0.2 to 5 wt.% and more preferably 0.3 to 3 wt.%.

The resulting co-comminuted mixture is then heat-treated together with titanium tetrachloride. Preferably, the above co-comminuted mixture is suspended in titanium tetrachloride or a solution thereof in an inert solvent and then heat-treated at a temperature of 40° to 135° C. Thereafer, the resulting composition is washed with an inert solvent to remove the free titanium tetrachloride or dried, if necessary, under reduced pressure.

On the occasion of the heat treatment, it is preferable to use a solution of titanium tetrachloride in an inert solvent because the bulk density of the resulting polymer is higher and the particle size distribution thereof is narrower. The concentration of titanium tetrachloride in this solution is not less than 0.1 vol.%, preferably 0.3 to 30 vol.% and more preferably 1 to 20 vol.%. The inert solvent used for this purpose is selected from aliphatic hydrocarbons, alicyclic hydrocarbons and aromatic hydrocarbons as well as halogenated derivatives of the foregoing. Specific examples thereof include hexane, heptane, benzene, toluene, chlorobenzene, cyclohexane and the like.

The component (A) obtained as a result of the heat treatment preferably contains from 0.1 to 10 wt.% of titanium.

The organic aluminum compound used as the component (B) of the present catalyst is a trialkylaluminum of the formula $$AlR_3^3$$

wherein $R^3$ is an alkyl radical of 1 to 12 carbon atoms. Specific examples thereof include trimethylaluminum, triethylaluminum, tri-n-propylaluminum, tri-n-butylaluminum, triisobutylaluminum, tri-n-hexylaluminum and the like.

In order to further improve the polymerization activity of the resulting catalyst, an alkylaluminum halide of the formula $$AlR_n^4 X_{3-n}$$

wherein $R^4$ is an alkyl radical of 1 to 12 carbon atoms, X is a halogen atom, and n is a number of 1 to 2, may preferably be added to the component (B). Specific examples thereof include diethylaluminum monochloride, ethylaluminum sesquichloride, ethylaluminum dichloride, diethylaluminum monobromide, diethylaluminum monoiodide, diethylaluminum monofluoride, di-n-propylaaluminum monochloride, diisobutylaluminum monochloride, di-n-hexylaluminum monochloride and the like.

In the present catalyst, the ratio of the component (A) to the component (B) can vary widely. However, the trialkylaluminum is generally used in an amount of 1 to 500 mmoles, preferably 3 to 100 mmoles and more preferably 5 to 50 mmoles per milligram atom of the titanium contained in the component (A). Similarly, the alkylaluminum halide is generally used in an amount of 0.05 to 100 moles, preferably 0.1 to 30 moles and more preferably 0.3 to 5 moles per mole of the trialkylaluminum. The trialkylaluminum is preferably added in small portions at suitable intervals of time during the polymerization, instead of being charged in bulk at the start of the polymerization. This is because such stepwise addition creates a good balance between the polymerization activity of the catalyst and the crystallinity of the resulting polymer and prevents the polymerization rate from changing with time.

The component (C) used in the present catalyst is an organic acid ester or a complex thereof with an aluminum halide. The organic acid ester may be the same as that used in the preparation of the component (A) and specific examples thereof have been mentioned previously. The complex of an organic acid ester with an aluminum halide can be prepared, for example, by mixing the the organic acid ester with the aluminum halide (preferably, aluminum chloride or aluminum bromide) or by heating such a mixture. For this purpose, the organic acid ester and the aluminum halide is preferably used in a molar ratio of 1:1.

The amount of component (C) used depends on the amount of component (B) used, the amount and titanium content of component (A) used, and polymerization conditions such as polymerization temperature and the like. However, the component (C) is generally used in an amount of not more than 5 moles, preferably 0.001 to 1.5 moles and more preferably 0.1 to 1 mole per mole of the trialkylaluminum used as the component (B).

The catalyst of the present invention can be applied to the homopolymerization of α-olefins having the formula

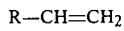

wherein R is an alkyl radical of 1 to 10 carbon atoms. It can also be applied to the copolymerization of such α-olefins and to the block or random copolymerization of such α-olefins and ehtylene. Specific examples of the above α-olefins include propylene, 1-butene, 1-hexene, 4-methyl-1-pentene and the like.

Polymerization reactions using the catalyst of the present invention can be carried out by the use of procedures and conditions conventionally known in this field of art. Specifically, the polymerization temperature is in the range of 20° to 100° C. and preferably 40° to 90° C., and the polymerization pressure is in the range of 1 to 60 kg/cm² abs. and preferably 1 to 50 kg/cm² abs. Generally, such polymerization reactions can be carried out in a solvent comprising at least one compound selected from aliphatic, alicyclic and aromatic hydrocarbons. Specific examples thereof include propane, butane, pentane, hexane, heptane, cyclohexane, benzene and the like as well as mixtures of the foregoing.

The catalyst of the present invention can also be applied to the bulk polymerization in which a liquid monomer per se is used as the solvent and to the so-called gas phase polymerization in which a gaseous monomer is contacted with a catalyst in a substantial absence of solvent.

In the process of the present invention, the molecular weight of the resulting polymer varies according to the mode of polymerization, the type of catalyst, and polymerization conditions. If desired, the molecular weight of the resulting polymer can further be controlled, for example, by adding hydrogen, an alkyl halide, a dialkylzinc or the like to the reactor.

The process of the present invention is characterized in that the polymerization activity of the catalyst is outstandingly high and, moreover, in that the content in the resulting polymer of the residual polymer obtainable after extraction with boiling n-heptane is as high as 95–97 wt.%. Thus, a polymer having satisfactorily good properties can be obtained even if the extraction or removal of non-crystalline polymer is omitted. This enables simplification of the production system.

Furthermore, in the process of the present invention, the additional use of an aluminum halide as the ingredient (e) in the preparation of the component (A) prevents the co-comminuted mixture from agglomerating to form a mass and, therefore, permits large amounts of raw materials to be charged into a pulverizer. In addition, the coarse particle content of the resulting polymer is so low that a slurry thereof can be easily handled without any trouble.

The present invention is further illustrated by way of the following examples.

EXAMPLE 1

(1) Preparation of Component (A)

A vibration mill equipped with a 600-ml pulverizing pot containing 80 steel balls of 12-mm diameter was provided. Into this pot were charged 20 g of anhydrous magnesium chloride, 2.1 g of ethyl benzoate, 2.3 g of chloroform and 3.4 g of diphenyl ether in an atmosphere of nitrogen. Then, these ingredients were co-comminuted for 20 hours.

Into a 300-ml round bottom flask were charged 10 g of the above co-comminuted mixture, 100 ml of n-heptane and 1.5 ml of titanium tetrachloride in an atmosphere of nitrogen, and the contents were stirred at 80° C. for 2 hours. Thereafter, the supernatant liquid was removed by decantation. Then, 200 ml of n-heptane was added to the flask and the contents were stirred at room temperature for 30 minutes. Thereafter, the supernatant liquid was removed by decantation. This washing operation was repeated 5 times.

Subsequently, 200 ml of n-heptane was further added to form a slurry of the composition (the component (A) of the present catalyst) obtained by supporting the titanium compound on the co-comminuted mixture. A sample of this slurry was taken and analyzed after the evaporation of n-heptane. Thus, the above composition was found to have a titanium content of 1.30 wt.%.

(2) Polymerization

A catalyst within the scope of the present invention was prepared as follows: Into a 2-liter autoclave made of SUS-32 (a stainless steel designated according to the Japanese Industrial Standards) were charged 1 liter of n-heptane, 0.20 g of the aforesaid component (A) (0.054 milligram atom at titanium), 0.4 ml (1.59 mmoles) of triisobutylaluminum and 0.10 ml (0.7 mmole) of ethyl benzoate in an atmosphere of nitrogen.

After the nitrogen present in the autoclave was evacuated by means of a vacuum pump, hydrogen was introduced thereinto up to a gas phase partial pressure of 0.3 kg/cm² abs., and propylene was then introduced to make the gas phase pressure 2 kg/cm² gauge. The contents of the autoclave were heated in such a manner that the internal temperature rose to 70° C. after 5 minutes, and the polymerization was continued for 2 hours while propylene was supplied so as to maintain the polymerization pressure of 5 kg/cm² gauge at 70° C. After being cooled, the autoclave was purged to expel unreacted propylene. Then, the contents were removed from the autoclave and filtered to obtain 230 g of a white polypropylene powder.

The content in this polypropylene powder of the residual polymer (crystalline polypropylene) obtainable after extraction with boiling n-heptane (hereinafter referred to as "powder I.I.") was 96.3 wt.%. The bulk density of the polypropylene powder was 0.48 g/ml and the intrinsic viscosity thereof was 1.61 dl/g (when measured in tetralin at 135° C.).

On the other hand, 3 g of an n-heptane-soluble polymer (non-crystalline polypropylene) was obtained by concentrating the filtrate.

When determined by a boiling n-heptane extraction test, the content of the residual polymer in the total polypropylene thus obtained (hereinafter referred to as "total I.I.") was 95.1 wt.%.

The polymerization activity of the catalyst used in this polymerization reaction was 552 g/g-(A)/hr. or 45 kg/g-Ti/hr. and the amount of polypropylene obtained was 1165 g/g-(A) or 90 kg/g-Ti.

Controls 1–3

In the preparation of the same co-comminuted mixture as used in the component (A) of Example 1, the addition of one or two of ethyl benzoate, chloroform and diphenyl ether was omitted to obtain a total of three different co-comminuted mixtures as shown in Table 1. Thereafter, these co-comminuted mixtures were heat-treated together with titanium tetrachloride in the same manner as described in Example 1-(1).

Polymerization was carried out in the same manner as described in Example 1, except that each of the compositions prepared as above was used as the component (A). The results thus obtained are shown in Table 2. As can be seen from the results of Table 2, the polymerization activity of the catalyst and the total I.I. and bulk density of the resulting polymer were all low when the co-comminuted mixture was composed solely of magnesium chloride and ethyl benzoate. However, the addition of chloroform raised the polymerization activity and the addition of diphenyl ether enhanced the polymerization activity, the total I.I. and the bulk density. This indicates that a catalyst prepared according to the present invention shows a great improvement in performance.

nium), 0.12 ml (0.97 mmole) of diethylaluminum monochloride, 0.10 ml (0.07 mmole) of ethyl benzoate and 0.4 ml (1.59 mmoles) of triisobutylaluminum were used as catalyst components. Among these components, the triisobutylaluminum was divided into six portions and introduced into the autoclave under pressure at intervals of 20 minutes. Polymerization was carried out in the same manner as described in Example 1, except that the aforesaid catalyst was used and the polymerization time was 2.5 hours. The results thus obtained are shown in Table 3.

EXAMPLES 3 AND 4

Polymerization was carried out in the same manner as described in Example 2, except that the diethylaluminum monochloride was replaced by an equimolar amount of ethylaluminum sesquichloride or ethylaluminum dichloride. The results thus obtained are shown in Table 3.

Control 4

Polymerization was carried out in the same manner as described in Example 2, except that the component (A) used in Example 2 was replaced by the component (A) of Control 1 designated as "Cat. a". The results thus obtained are shown in Table 3.

TABLE 1
PREPARATION OF CARRIER TYPE TITANIUM COMPONENT

| Designation | Co-comminuted Mixture | | | | Component after Heat Treatment with TiCl$_4$ (wt. %) |
|---|---|---|---|---|---|
| | Magnesium Chloride (g) | Ethyl Benzoate (g) | Chloroform (g) | Diphenyl Ether (g) | Titanium Content of Carrier Type Titanium |
| Cat. a | 20 | 2.1 | — | — | 1.20 |
| Cat. b | 20 | 2.1 | 2.3 | — | 1.42 |
| Cat. c | 20 | 2.1 | — | 3.4 | 1.08 |

TABLE 2

| Run No. | Designation of Component (A) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) |
|---|---|---|---|---|---|---|---|---|---|---|---|
| Control 1 | Cat. a | 96 | 6 | 93.5 | 88.0 | 265 | 22 | 510 | 43 | 1.60 | 0.30 |
| Control 2 | Cat. b | 183 | 6 | 93.3 | 90.3 | 473 | 33 | 945 | 66 | 1.73 | 0.29 |
| Control 3 | Cat. c | 93 | 6 | 94.4 | 88.7 | 248 | 23 | 495 | 46 | 1.68 | 0.31 |

TABLE 3

| Run No. | Type of Alkylaluminum Halide | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) |
|---|---|---|---|---|---|---|---|---|---|---|---|
| Example 2 | AlEt$_2$Cl | 517 | 5 | 98.2 | 97.3 | 1044 | 80 | 2610 | 201 | 1.65 | 0.49 |
| Example 3 | AlEt$_{3/2}$Cl$_{3/2}$ | 492 | 4 | 97.9 | 97.1 | 992 | 76 | 2480 | 191 | 1.62 | 0.48 |
| Example 4 | AlEtCl$_2$ | 488 | 4 | 97.8 | 97.0 | 984 | 76 | 2460 | 189 | 1.78 | 0.49 |
| Control 4 | AlEt$_2$Cl | 153 | 7 | 93.1 | 89.0 | 320 | 27 | 800 | 67 | 1.53 | 0.31 |

EXAMPLES 5–12

In the preparation of the same component (A) as described in Example 1-(1), the chloroform used as the ingredient (c) was replaced by various halogenated hydrocarbons to obtain a total of eight different compositions.

Polymerization was carried out in the same manner as described in Example 2, except that each of the above compositions was used as the component (A). The results thus obtained are shown in Table 4.

EXAMPLE 2

In this example, 0.20 g of the component (A) prepared in Example 1-(1) (0.054 milligram atom as tita-

TABLE 4
EXPERIMENTAL RESULTS

| Run No. | Component (A) Type of Ingredient (c) | Titanium Content (wt. %) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) |
|---|---|---|---|---|---|---|---|---|---|---|---|---|
| Example 5 | Methylene chloride | 1.25 | 510 | 4 | 97.7 | 96.9 | 1028 | 82 | 2570 | 206 | 1.69 | 0.48 |
| Example 6 | Carbon tetrachloride | 1.30 | 486 | 4 | 97.7 | 96.9 | 980 | 75 | 2450 | 188 | 1.77 | 0.49 |
| Example 7 | n-Butyl chloride | 1.31 | 507 | 4 | 98.1 | 97.3 | 1022 | 78 | 2555 | 195 | 1.89 | 0.48 |
| Example 8 | 1,2-Dichloroethane | 1.31 | 504 | 4 | 97.8 | 97.0 | 1016 | 76 | 2540 | 194 | 1.79 | 0.48 |
| Example 9 | Hexachloroethane | 1.29 | 490 | 5 | 98.3 | 97.3 | 990 | 77 | 2475 | 192 | 1.67 | 0.49 |
| Example 10 | Propenyl chloride | 1.33 | 513 | 5 | 97.7 | 96.8 | 1036 | 78 | 2590 | 195 | 1.85 | 0.49 |
| Example 11 | Tetrabromoethane | 1.37 | 488 | 4 | 97.8 | 97.0 | 984 | 72 | 2460 | 180 | 1.86 | 0.48 |
| Example 12 | Chlorinated paraffin (having a Cl content of 70 wt.%) | 1.35 | 491 | 5 | 98.2 | 97.2 | 992 | 73 | 2480 | 184 | 1.66 | 0.48 |

EXAMPLE 13-23

In the preparation of the same component (A) as described in Example 1-(1), the diphenyl ether used as the ingredient (d) was replaced by various compounds to obtain a total of eleven different compositions.

Polymerization was carried out in the same manner as described in Example 2, except that each of the above compositions was used as the component (A). The results thus obtained are shown in Table 5.

TABLE 5
EXPERIMENTAL RESULTS

| Run No. | Component (A) Type of Ingredient (d) | Titanium Content (wt. %) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) |
|---|---|---|---|---|---|---|---|---|---|---|---|---|
| Example 13 | n-Heptane | 1.37 | 485 | 6 | 96.3 | 95.1 | 982 | 72 | 2455 | 179 | 1.63 | 0.40 |
| Example 14 | n-Octane | 1.30 | 517 | 7 | 96.3 | 95.0 | 1028 | 79 | 2570 | 197 | 1.65 | 0.41 |
| Example 15 | 1-Octane | 1.31 | 494 | 6 | 96.2 | 95.1 | 1000 | 76 | 2500 | 191 | 1.67 | 0.40 |
| Example 16 | Toluene | 1.40 | 484 | 6 | 95.9 | 94.7 | 980 | 70 | 2450 | 176 | 1.84 | 0.39 |
| Example 17 | Cyclohexane | 1.29 | 488 | 7 | 96.3 | 94.9 | 990 | 77 | 2475 | 192 | 1.64 | 0.39 |
| Example 18 | Monochlorobenzene | 1.35 | 518 | 6 | 96.3 | 95.2 | 1048 | 77 | 2620 | 194 | 1.78 | 0.41 |
| Example 19 | Propylene oligomer (mol.wt.400) | 1.30 | 513 | 5 | 96.7 | 95.8 | 1036 | 80 | 2590 | 199 | 1.65 | 0.45 |
| Example 20 | Propylene oligomer (mol.wt.730) | 1.26 | 508 | 5 | 97.0 | 95.1 | 1026 | 81 | 2565 | 204 | 1.68 | 0.45 |
| Example 21 | Methyl phenyl ether | 1.32 | 485 | 5 | 98.0 | 97.0 | 980 | 74 | 2450 | 186 | 1.67 | 0.49 |
| Example 22 | Ethyl phenyl ether | 1.39 | 485 | 4 | 97.7 | 96.9 | 978 | 70 | 2445 | 176 | 1.69 | 0.48 |
| Example 23 | Ditolyl ether | 1.39 | 507 | 4 | 98.0 | 97.2 | 1022 | 74 | 2555 | 184 | 1.67 | 0.48 |

EXAMPLES 24-27

Polymerization was carried out in the same manner as described in Example 2, except that the ethyl benzoate used as the component (C) was replaced by an equimolar amount of various organic acid esters. The results thus obtained are shown in Table 6.

TABLE 6

EXPERIMENTAL RESULTS

| Run No. | Type of Component (C) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) |
|---|---|---|---|---|---|---|---|---|---|---|---|
| Example 24 | Methylbenzoate | 517 | 4 | 98.0 | 97.2 | 1042 | 80 | 2605 | 200 | 1.71 | 0.49 |
| Example 25 | Isobutyl benzoate | 489 | 4 | 97.8 | 97.0 | 985 | 76 | 2465 | 190 | 1.77 | 0.49 |
| Example 26 | Isoamyl benzoate | 507 | 5 | 97.8 | 96.8 | 1024 | 79 | 2560 | 197 | 1.66 | 0.48 |
| Example 27 | Ethyl anisate | 495 | 4 | 98.1 | 97.3 | 998 | 77 | 2495 | 192 | 1.79 | 0.48 |

EXAMPLES 28–32 ylaluminum. The results thus obtained are shown in Table 7.

TABLE 7

EXPERIMENTAL RESULTS

| Run No. | Catalyst Components Component(A) (g) | Catalyst Components Triisobutylaluminum (ml) | Catalyst Components Diethyl Aluminum Monochloride (ml) | Catalyst Components Ethyl Benzoate (ml) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) |
|---|---|---|---|---|---|---|---|---|---|---|---|---|---|---|
| Example 28 | 0.2 | 0.4 | 0.24 | 0.12 | 505 | 4 | 98.1 | 97.3 | 1018 | 78 | 2545 | 196 | 1.69 | 0.48 |
| Example 29 | 0.2 | 0.3 | 0.24 | 0.10 | 505 | 3 | 98.1 | 97.5 | 1018 | 78 | 2545 | 196 | 1.67 | 0.49 |
| Example 30 | 0.15 | 0.4 | 0.12 | 0.10 | 381 | 5 | 98.0 | 96.7 | 1029 | 79 | 2575 | 198 | 1.73 | 0.47 |
| Example 31 | 0.15 | 0.4 | 0.24 | 0.10 | 486 | 5 | 97.6 | 96.6 | 1309 | 101 | 3273 | 252 | 1.64 | 0.48 |
| Example 32 | 0.2 | 0.4 | 0.12 | 0.12 | 374 | 3 | 98.3 | 97.5 | 746 | 57 | 1865 | 143 | 1.78 | 0.48 |
| Example 33 | 0.2 | 0.22* | 0.24 | 0.10 | 483 | 5 | 97.9 | 96.9 | 976 | 76 | 2440 | 188 | 1.65 | 0.49 |

*Triethylaluminum

Polymerization was carried out in the same manner as described in Example 2, except that the amounts of the component (A), diethylaluminum monochloride, ethyl benzoate and triisobutylaluminum used were varied. The results thus obtained are shown in Table 7.

EXAMPLE 33

Polymerization was carried out in the same manner as described in Example 2, except that the triisobutylaluminum was replaced by an equimolar amount of triethylaluminum.

EXAMPLES 34–39

In the preparation of the same component (A) as described in Example 1-(1), the chemical makeup of the co-comminuted mixture composed of magnesium chloride, ethyl benozate, chloroform and diphenyl ether was modified as shown in Table 8 to obtain a total of six different compositions.

Polymerization was carried out in the same manner as described in Example 1, except that each of the above compositions was used as the component (A). The results thus obtained are shown in Table 8.

TABLE 8

EXPERIMENTAL RESULTS

| Run No. | Component (A) Co-comminuted Mixture Magnesium Chloride (g) | Ethyl Benzoate (g) | Chloroform (g) | Diphenyl Ether (g) | Titanium Content (wt. %) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) |
|---|---|---|---|---|---|---|---|---|---|---|---|---|---|---|---|
| Example 34 | 20 | 2.1 | 2.3 | 1.7 | 1.44 | 225 | 4 | 96.8 | 95.1 | 573 | 40 | 1145 | 80 | 1.66 | 0.48 |
| Example 35 | 20 | 2.1 | 2.3 | 6.8 | 1.18 | 217 | 3 | 96.7 | 95.4 | 550 | 47 | 1100 | 93 | 1.65 | 0.48 |
| Example 36 | 20 | 1.1 | 2.3 | 3.4 | 1.38 | 258 | 4 | 96.2 | 94.7 | 655 | 47 | 1310 | 93 | 1.66 | 0.48 |
| Example | 20 | 4.2 | 2.3 | 3.4 | 1.27 | 197 | 4 | 96.9 | 95.0 | 503 | 40 | 1005 | 79 | 1.71 | 0.49 |

TABLE 8-continued

EXPERIMENTAL RESULTS

| | Component (A) | | | | | Yield | | | | Polymerization Activity | | Amount of Polymer Obtained | | | |
|---|---|---|---|---|---|---|---|---|---|---|---|---|---|---|---|
| | Co-comminuted Mixture | | | | Titanium Content (wt. %) | Polypropylene Powder (g) | Non-crystalline Polypropylene (g) | Powder I.I. (wt. %) | Total I.I. (wt. %) | | | | | Intrinsic Viscosity (dl/g) | Bulk Density (g/ml) |
| Run No. | Magnesium Chloride (g) | Ethyl Benzoate (g) | Chloroform (g) | Diphenyl Ether (g) | | | | | | g/g-(A)/hr. | kg/g-Ti/hr. | g/g-(A) | kg/g-Ti | | |
| Example 37 | | | | | | | | | | | | | | | |
| Example 38 | 20 | 2.1 | 1.2 | 3.4 | 1.11 | 181 | 4 | 96.6 | 94.5 | 463 | 42 | 925 | 83 | 1.78 | 0.49 |
| Example 39 | 20 | 2.1 | 4.6 | 3.4 | 1.68 | 283 | 4 | 96.2 | 94.9 | 718 | 43 | 1435 | 85 | 1.77 | 0.48 |

EXAMPLE 40

Polymerization was carried out in the same manner as described in Example 2, except that the ethyl benzoate used during the polymerization was replaced by 0.193 g of a 1:1 complex of ethyl benzoate with aluminum chloride and the component (A) was used in an amount of 0.15 g. The results thus obtained are shown in Table 9.

bulk density thereof was 0.48 g/ml, and the ethylene content thereof was 19.3 wt.%. The total I.I. of the resulting polymer was 96.4 wt.%.

The polymerization activity of the catalyst used in this polymerization reaction was 1128 g/g-(A)hr. or 87 kg/g-Ti/hr. and the amount of polymer obtained was 2695 g/g-(A) or 200 kg/g-Ti.

The following Examples 43–76 illustrate the use of an aluminum halide as the optional ingredient (e) in the

TABLE 9

EXPERIMENTAL RESULTS

| | | Yield | | | | Polymerization Activity | | Amount of Polymer Obtained | | | |
|---|---|---|---|---|---|---|---|---|---|---|---|
| Run No. | Type of Component (C) | Polypropylene Powder (g) | Non-crystalline Polypropylene (g) | Powder I.I. (wt. %) | Total I.I. (wt. %) | g/g-(A)/hr. | kg/g-Ti/hr. | g/g-(A) | kg/g-Ti | Intrinsic Viscosity (dl/g) | Bulk Density (g/ml) |
| Example 40 | PhCOOEt · AlCl₃ | 485 | 4 | 97.7 | 96.9 | 1304 | 100 | 3260 | 251 | 1.77 | 0.48 |

EXAMPLE 41

Polymerization was carried out in the same manner as described in Example 2, except that the propylene used as the monomer was replaced by a mixed gas of propylene and ethylene having an ethylene concentration of 1.0 wt.%. The polymerization was continued for 2.15 hours to obtain 484 g of polypropylene powder and 6 g of non-crystalline polypropylene.

The powder I.I. of this polypropylene powder was 96.3 wt.%, the intrinsic viscosity thereof was 1.72 dl/g, the bulk density thereof was 0.47 g/ml, and the ethylene content thereof was 0.6 wt.%. The total I.I. of the resulting polymer was 95.1 wt.%.

The polymerization activity of the catalyst used in this polymerization reaction was 1139 g/g-(A)/hr, or 88 kg/g-Ti/hr. and the amount of polymer obtained was 2450 g/g-(A) or 189 kg/g-Ti.

EXAMPLE 42

Polymerization was carried out in the same manner as described in Example 2. The polymerization was continued for 1.7 hours until about 400 g of propylene was polymerized. After the autoclave was cooled, the propylene present therein was replaced by ethylene, and 0.1 ml of triisobutylaluminum was introduced thereinto. Using a hydrogen partial pressure of 1.5 kg/cm² abs., a polymerization pressure of 5 kg/cm² gauge and a polymerization temperature of 70° C., the polymerization was further continued for 0.6 hour to obtain 513 g of polymer powder and 6 g of non-crystalline polymer.

The powder I.I. of this polymer powder was 97.5 wt.%, the intrinsic viscosity thereof was 1.73 dl/g, the preparation of the component (A) of the present catalyst.

EXAMPLE 43

(1) Preparation of Component (A)

A vibration mill equipped with a 600-ml pulverizing pot containing 80 steel balls of 12-mm diameter was provided. Into this pot were charged 30 g of anhydrous magnesium chloride, 3.15 g of ethyl benzoate, 3.45 g of chloroform, 5.1 g of diphenyl ether and 0.38 g of aluminum chloride in an atmosphere of nitrogen. Then, these ingredients were co-comminuted for 20 hours. When the pot was opened, it was found that the co-comminuted mixture neither had agglomerated to form a mass nor stuck to the inner walls of the pot or the steel balls.

Into a 300-ml round bottom flask were charged 10 g of the above co-comminuted mixture, 100 ml of n-heptane and 1.5 ml of titanium tetrachloride in an atmosphere of nitrogen, and the contents were stirred at 80° C. for 2 hours. Thereafter, the supernatant liquid was removed by decantation. Then, 200 ml of n-heptane was added to the flask and the contents were stirred at room temperature for 30 minutes. Thereafter, the supernatant liquid was removed by decantation. This washing operation was repeated 5 times.

Subsequently, 200 ml of n-heptane was further added to form a slurry of the composition (the component (A) of the present catalyst) obtained by supporting the titanium compound on the co-comminuted mixture. A sample of this slurry was taken and analyzed after the evaporation of n-heptane. Thus the above composition was found to have a titanium content of 1.12 wt.%.

(2) Polymerization

A catalyst within the scope of the present invention was prepared as follows: Into a 2-liter autoclave made of SUS-32 were charged 1 liter of n-heptane, 0.15 g of the aforesaid component (A) (0.035 milligram atom as titanium), 0.4 ml (1.59 mmoles) of triisobutylaluminum and 0.10 ml (0.7 mmole) of ethyl benzoate in an atomsphere of nitrogen.

After the nitrogen present in the autoclave was evacuated by means of a vacuum pump, hydrogen was introduced thereinto up to a gas phase partial pressure of 0.3 kg/cm$^2$ abs., and propylene was then introduced to make the gas phase pressure 2 kg/cm$^2$ gauge. The contents of the autoclave were heated in such a manner that the internal temperature rose to 70° C. after 5 minutes, and the polymerization was continued for 2 hours while propylene was supplied so as to maintain the polymerization pressure of 5 kg/cm$^2$ gauge at 70° C. After being cooled, the autoclave was purged to expel unreacted propylene. Then, the contents were removed from the autoclave and filtered to obtain 230 g of a white polypropylene powder.

The powder I.I. of this polypropylene powder was 96.4 wt.%, the bulk density thereof was 0.48 g/ml, and the intrinsic viscosity thereof was 1.64 dl/g (when measured in tetralin at 135° C.).

On the other hand, 3 g of an n-heptane-soluble polymer (non-crystalline polypropylene) was obtained by concentrating the filtrate.

The total I.I. of the resulting polymer was 95.2 wt.%.

The polymerization activity of the catalyst used in this polymerization reaction was 803 g/g-(A)/hr. or 72 kg/g-Ti/hr. and the amount of polypropylene obtained was 1606 g/g-(A) or 143 kg/g-Ti. The above polypropylene powder was sifted to examine its particle size distribution. This revealed that the content of the particles not passed by a 10-mesh screen (hereinafter referred to as "coarse particles") was 1.0 wt.% and the content of the particles passed by a 200-mesh screen (hereinafter referred to as "fine particles") was 8.3 wt.%.

REFERENCE EXAMPLE 1

(1) Preparation of Component (A)

In the preparation of the same co-comminuted mixture as described in Example 43-(1), the addition of aluminum chloride was omitted. When the pot was opened, about 5 g of the resulting co-comminuted mixture was found to stick to the inner walls of the pot and the steel balls.

In the same manner as described in Example 43-(1), the above co-comminuted mixture was heat-treated together with titanium tetrachloride and then washed with n-heptane to form a slurry of the composition obtained by supporting the titanium compound on the co-comminuted mixture. This composition had a titanium content of 1.32 wt.%.

(2) Polymerization

Polymerization was carried out in the same manner as described in Example 43, except that 0.20 g of the aforesaid composition (0.055 milligram atom as titanium) was used as the component (A). Thus, 232 g of polypropylene powder was obtained.

The powder I.I. of this polypropylene powder was 96.1 wt.%, the bulk density thereof was 0.48 g/dl, and the intrinsic viscosity thereof was 1.63 dl/g.

On the other hand, 3 g of non-crystalline polypropylene was obtained by concentrating the filtrate.

The total I.I. of the resulting polymer was 94.9 wt.%.

The polymerization activity of the catalyst used in this polymerization reaction was 588 g/g-(A)/hr. or 45 kg/g-Ti/hr. and the amount of polypropylene obtained was 1175 g/g-(A) or 89 kg/g-Ti.

The above polypropylene powder was sifted to examine its particle size distribution. This revealed that its coarse particle content was 7.0 wt.% and its fine particle content was 10.8 wt.%.

EXAMPLE 44

In this example, 0.15 g of the component (A) prepared in Example 43-(1) (0.035 milligram atom as titanium), 0.12 ml (0.97 mmole) of diethylaluminum monochloride, 0.10 ml (0.07 mmole) of ethyl benzoate and 0.4 ml (1.59 mmoles) of triisobutylaluminum were used as catalyst components. Among these components, the triisobutylaluminum was divided into six portions and introduced into the autoclave under pressure at intervals of 20 minutes. Polymerization was carried out in the same manner as described in Example 43, except that the aforesaid catalyst was used and the polymerization time was 2.5 hours. The results thus obtained are shown in Table 10.

EXAMPLES 45 AND 46

Polymerization was carried out in the same manner as described in Example 44, except that the diethylaluminum monochloride was replaced by an equimolar amount of ethylaluminum sesquichloride or ethylaluminum dichloride. The results thus obtained are shown in Table 10.

TABLE 10

| | | EXPERIMENTAL RESULTS | | | | | | | | | | |
|---|---|---|---|---|---|---|---|---|---|---|---|---|
| | | Yield | | | | Polymerization Activity | | Amount of Polymer Obtained | | | | Coarse Particle | Fine Particle |
| Run No. | Type Alkyl-aluminum Halide | Polypropylene Powder (g) | Non-crystalline Polypropylene (g) | Powder I.I. (wt. %) | Total I.I. (wt. %) | g/g-(A)/hr. | kg/g-Ti/hr. | g/g-(A) | kg/g-Ti | Intrinsic Viscosity (dl/g) | Bulk Density (g/ml) | Content (wt. %) | Content (wt. %) |
| Example 44 | AlEt$_2$Cl | 508 | 5 | 98.1 | 97.1 | 1368 | 122 | 3420 | 305 | 1.70 | 0.49 | 1.5 | 6.5 |
| Example 45 | AlEt$_{3/2}$Cl$_{3/2}$ | 535 | 5 | 97.7 | 96.8 | 1440 | 129 | 3600 | 321 | 1.81 | 0.48 | 0.9 | 5.3 |
| Example 46 | AlEtCl$_2$ | 521 | 4 | 97.9 | 97.2 | 1400 | 125 | 3500 | 313 | 1.69 | 0.48 | 1.8 | 6.1 |

EXAMPLE 47-54

In the preparation of the same component (A) as described in Example 43-(1), the chloroform used as the ingredient (c) was replaced by various halogenated hydrocarbons to obtain a total of eight different compositions.

Polymerization was carried out in the same manner as described in Example 44, except that each of the above composition was used as the component (A). The results thus obtained are shown in Table 11.

EXAMPLES 55-65

In the preparation of the same component (A) as described in Example 43-(1), the diphenyl ether used as the ingredient (d) was replaced by various components to obtain a total of eleven different compositions.

Polymerization was carried out in the same manner as described in Example 44, except that each of the above compositions was used as the component (A). The results thus obtained are shown in Table 12.

TABLE 11
EXPERIMENTAL RESULTS

| Run No. | Component (A) Type of Ingredient (c) | Titanium Content (wt. %) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) | Coarse Particle Content (wt. %) | Fine Particle Content (wt. %) | Coarse Particle Content Observed Without Addition of AlCl3 (wt. %) |
|---|---|---|---|---|---|---|---|---|---|---|---|---|---|---|---|
| Ex. 47 | Methylene chloride | 1.18 | 525 | 5 | 97.7 | 96.8 | 1413 | 120 | 3533 | 299 | 1.69 | 0.49 | 1.1 | 6.1 | 6.8 |
| Ex. 48 | Carbon tetrachloride | 1.17 | 535 | 4 | 97.7 | 97.0 | 1437 | 123 | 3593 | 307 | 1.68 | 0.49 | 1.5 | 5.3 | 7.2 |
| Ex. 49 | n-Butyl chloride | 1.18 | 523 | 5 | 98.1 | 97.2 | 1407 | 119 | 3520 | 298 | 1.71 | 0.48 | 1.2 | 5.7 | 6.8 |
| Ex. 50 | 1,2-Dichloroethane | 1.13 | 502 | 5 | 97.8 | 96.8 | 1352 | 120 | 3380 | 299 | 1.73 | 0.48 | 1.5 | 5.8 | 6.9 |
| Ex. 51 | Hexachloroethane | 1.17 | 491 | 4 | 97.8 | 97.0 | 1320 | 113 | 3300 | 282 | 1.66 | 0.48 | 1.4 | 6.1 | 6.9 |
| Ex. 52 | Propenyl chloride | 1.15 | 533 | 4 | 97.7 | 97.0 | 1432 | 125 | 3580 | 311 | 1.69 | 0.48 | 1.6 | 6.1 | 7.0 |
| Ex. 53 | Tetrabromoethane | 1.15 | 501 | 4 | 97.9 | 97.1 | 1346 | 117 | 3367 | 293 | 1.62 | 0.48 | 1.1 | 5.8 | 7.1 |
| Ex. 54 | Chlorinated paraffin (having a Cl content of 70 wt. %) | 1.12 | 522 | 4 | 98.1 | 97.4 | 1403 | 125 | 3507 | 313 | 1.70 | 0.49 | 1.3 | 5.9 | 7.1 |

TABLE 12
EXPERIMENTAL RESULTS

| Run No. | Component (A) Type of Ingredient (d) | Titanium Content (wt. %) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) | Coarse Particle Content (wt. %) | Fine Particle Content (wt. %) | Coarse Particle Content Observed Without Addition of AlCl3 (wt. %) |
|---|---|---|---|---|---|---|---|---|---|---|---|---|---|---|---|
| Ex. 55 | n-Heptane | 1.19 | 501 | 6 | 96.2 | 95.1 | 1352 | 114 | 3380 | 284 | 1.65 | 0.40 | 1.1 | 5.7 | 7.2 |
| Ex. 56 | n-Octane | 1.16 | 521 | 7 | 96.3 | 95.0 | 1408 | 121 | 3520 | 303 | 1.67 | 0.39 | 0.9 | 6.1 | 7.2 |
| Ex. 57 | 1-Octene | 1.20 | 513 | 7 | 96.1 | 94.8 | 1387 | 115 | 3467 | 289 | 1.66 | 0.40 | 1.4 | 6.2 | 6.8 |
| Ex. 58 | Toluene | 1.15 | 521 | 6 | 95.9 | 94.8 | 1406 | 122 | 3513 | 306 | 1.60 | 0.41 | 1.1 | 6.5 | 7.6 |
| Ex. 59 | Cyclohexane | 1.18 | 503 | 6 | 96.3 | 95.2 | 1357 | 115 | 3393 | 288 | 1.58 | 0.41 | 1.0 | 6.2 | 6.9 |
| Ex. 60 | Monochlorobenzene | 1.16 | 522 | 7 | 96.0 | 94.7 | 1411 | 122 | 3527 | 304 | 1.62 | 0.40 | 1.4 | 5.7 | 7.4 |
| Ex. 61 | Propylene oligomer (mol.wt. 400) | 1.19 | 524 | 5 | 96.8 | 95.9 | 1411 | 119 | 3527 | 296 | 1.73 | 0.45 | 1.2 | 6.1 | 6.3 |
| Ex. 62 | Propylene oligomer (mol.wt. 730) | 1.18 | 516 | 5 | 97.1 | 96.2 | 1389 | 117 | 3473 | 294 | 1.67 | 0.45 | 1.1 | 6.4 | 6.7 |

TABLE 12-continued
EXPERIMENTAL RESULTS

| Run No. | Component (A) Type of Ingredient (d) | Titanium Content (wt. %) | Yield Polypropylene Powder (g) | Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) | Coarse Particle Content (wt. %) | Fine Particle Content (wt. %) | Coarse Particle Content Observed Without Addition of AlCl₃ (wt. %) |
|---|---|---|---|---|---|---|---|---|---|---|---|---|---|---|---|
| Ex. 63 | Methyl phenyl ether | 1.18 | 514 | 4 | 97.8 | 97.0 | 1381 | 117 | 3453 | 293 | 1.59 | 0.48 | 1.7 | 6.4 | 6.3 |
| Ex. 64 | Ethyl phenyl ether | 1.17 | 504 | 4 | 97.7 | 96.9 | 1355 | 116 | 3387 | 289 | 1.73 | 0.49 | 1.1 | 6.4 | 6.9 |
| Ex. 65 | Ditolyl ether | 1.22 | 525 | 4 | 97.9 | 97.2 | 1410 | 116 | 3527 | 289 | 1.70 | 0.49 | 1.3 | 6.5 | 7.2 |

EXAMPLES 66–73

In the preparation of the same component (A) as described in Example 43-(1), the chemical makeup of the co-communited mixture composed of magnesium chloride, ethyl benzoate, chloroform, diphenyl ether and aluminum chloride was modified as shown in Table 13 to obtain a total of eight different compositions.

Polymerization was carried out in the same manner as described in Example 43, except that each of the above compositions was used as the component (A). The results thus obtained are shown in Table 13.

TABLE 13
EXPERIMENTAL RESULTS

| Run No. | Component (A) Co-comminuted Mixture | | | | | Titanium Content (wt. %) | Yield Polypropylene Powder (g) | Yield Non-crystalline Polypropylene (g) | Powder I.I. (wt. %) | Total I.I. (wt. %) |
|---|---|---|---|---|---|---|---|---|---|---|
| | Magnesium Chloride (g) | Ethyl Benzoate (g) | Chloroform (g) | Diphenyl Ether (g) | Aluminum Chloride (g) | | | | | |
| Example 66 | 30 | 3.15 | 3.45 | 5.1 | 0.15 | 1.21 | 233 | 3 | 96.3 | 95.1 |
| Example 67 | 30 | 3.15 | 3.45 | 5.1 | 0.60 | 1.16 | 238 | 3 | 95.9 | 94.7 |
| Example 68 | 30 | 3.15 | 3.45 | 2.55 | 0.38 | 1.17 | 229 | 4 | 96.6 | 94.9 |
| Example 69 | 30 | 3.15 | 3.45 | 10.2 | 0.38 | 1.18 | 223 | 4 | 96.6 | 94.9 |
| Example 70 | 30 | 1.65 | 3.45 | 5.1 | 0.38 | 1.15 | 244 | 3 | 95.7 | 94.2 |
| Example 71 | 30 | 6.3 | 3.45 | 5.1 | 0.38 | 1.20 | 195 | 3 | 96.8 | 95.3 |
| Example 72 | 30 | 3.15 | 1.8 | 5.1 | 0.38 | 1.18 | 183 | 4 | 96.6 | 94.5 |
| Example 73 | 30 | 3.15 | 6.9 | 5.1 | 0.38 | 1.16 | 289 | 4 | 96.0 | 94.7 |

| Run No. | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) | Coarse Particle Content (wt. %) | Fine Particle Content (wt. %) | Coarse Particle Content Observed Without Addition of AlCl₃ (wt. %) |
|---|---|---|---|---|---|---|---|---|---|
| Example 66 | 787 | 65 | 1573 | 130 | 1.65 | 0.48 | 0.9 | 6.1 | 6.7 |
| Example 67 | 804 | 69 | 1607 | 139 | 1.67 | 0.49 | 1.3 | 6.3 | 6.4 |
| Example 68 | 743 | 64 | 1486 | 127 | 1.62 | 0.49 | 1.6 | 7.1 | 7.3 |
| Example 69 | 757 | 64 | 1515 | 128 | 1.69 | 0.49 | 1.0 | 6.5 | 6.5 |
| Example 70 | 824 | 72 | 1647 | 143 | 1.67 | 0.48 | 1.3 | 6.3 | 6.2 |
| Example 71 | 660 | 55 | 1320 | 110 | 1.66 | 0.49 | 1.1 | 6.7 | 6.6 |
| Example 72 | 624 | 53 | 1247 | 106 | 1.63 | 0.49 | 1.3 | 7.1 | 6.3 |
| Example 73 | 977 | 65 | 1953 | 130 | 1.62 | 0.48 | 1.2 | 6.4 | 6.5 |

EXAMPLE 74

Polymerization was carried out in the same manner as described in Example 44, except that the ethyl benzoate used during the polymerization was replaced by 0.198 g of a 1:1 complex of ethyl benzoate with aluminum chloride and the polymerization time was 2 hours. The results thus obtained are shown in Table 14.

TABLE 14

EXPERIMENTAL RESULTS

| Run No. | Type of Component (C) | Yield Polypropylene Powder (g) | Yield Non-crystalline Polypropylene (g) | Powder I.I. (wt. %) | Total I.I. (wt. %) | Polymerization Activity g/g-(A)/hr. | Polymerization Activity kg/g-Ti/hr. | Amount of Polymer Obtained g/g-(A) | Amount of Polymer Obtained kg/g-Ti | Intrinsic Viscosity (dl/g) | Bulk Density (g/ml) | Coarse Particle Content (wt. %) | Fine Particle Content (wt. %) | Coarse Particle Content Obtained Without Addition of AlCl$_3$ (wt. %) |
|---|---|---|---|---|---|---|---|---|---|---|---|---|---|---|
| Ex. 74 | PhCOOEt · AlCl$_3$ | 500 | 4 | 97.8 | 97.0 | 1680 | 150 | 3360 | 300 | 1.69 | 0.48 | 1.3 | 6.8 | 7.0 |

EXAMPLE 75

Polymerization was carried out in the same manner as described in Example 44, except that the propylene used as the monomer was replaced by a mixed gas of propylene and ethylene having an ethylene concentration of 1.0 wt.%. The polymerization was continued for 2.15 hours to obtain 503 g of polypropylene powder and 7 g of non-crystalline polypropylene.

The powder I.I. of this polypropylene powder was 96.0 wt.%, the intrinsic viscosity thereof was 1.70 dl/g, the bulk density thereof was 0.47 g/ml, and the ethylene content thereof was 0.6 wt.%. The total I.I. of the resulting polymer was 94.7 wt.%.

The polymerization activity of the catalyst used in this polymerization reaction was 1581 g/g-(A)/hr. or 141 kg/g-Ti/hr. and the amount of polymer obtained was 3400 g/g-(A) or 304 kg/g-Ti.

EXAMPLE 76

Polymerization was carried out in the same manner as described in Example 44. The polymerization was continued for 1.7 hours until about 400 g of propylene was polymerized. After the autoclave was cooled, the propylene present therein was replaced by ethylene, and 0.1 ml of triisobutylaluminum was introduced thereinto. Using a hydrogen partial pressure of 1.5 kg/cm$^2$ abs., a polymerization pressure of 5 kg/cm$^2$ gauge and a polymerization temperature of 70° C., the polymerization was further continued for 0.6 hour to obtain 518 g of polymer powder and 7 g of non-crystalline polymer.

The powder I.I. of this polymer powder was 97.0 wt.%, the intrinsic viscosity thereof was 1.83 dl/g, the bulk density thereof was 0.48 g/ml, and the ethylene content thereof was 18.3 wt.%. The total I.I. of the resulting polymer was 95.7 wt.%.

The polymerization activity of the catalyst used in this polymerization reaction was 1527 g/g-(A)/hr. or 136 kg/g-Ti/hr. and the amount of polymer obtained was 3500 g/g-(A) or 312 kg/g-Ti.

What is claimed is:

1. A catalyst for polymerizing α-olefins comprising
   (A) a composition obtained by co-comminuting
      (a) a magnesium halide,
      (b) a carboxylic acid ester,
      (c) a halogenated aliphatic or alicyclic hydrocarbon, and
      (d) at least one ingredient selected from the group consisting of aliphatic hydrocarbons, alicyclic hydrocarbons, aromatic hydrocarbons, halogenated aromatic hydrocarbons, liquid propylene oligomers and aromatic ethers
   and then heat-treating the resulting mixture at a temperature of 40° to 135° C. together with titanium tetrachloride;
   (B) a trialkylaluminum compound; and
   (C) a carboxylic ester or a complex thereof with an aluminum halide.

2. A catalyst for polymerizing α-olefins comprising
   (A) a composition obtained by co-comminuting
      (a) a magnesium halide,
      (b) a carboxylic acid ester,
      (c) a halogenated aliphatic or alicyclic hydrocarbon,
      (d) at least one ingredient selected from the group consisting of aliphatic hydrocarbons, alicyclic hydrocarbons, aromatic hydrocarbons, halogenated aromatic hydrocarbons, liquid propylene oligomers and aromatic ethers, and
      (e) an aluminum halide
   and then heat-treating the resulting mixture at a temperature of 40° to 135° C. together with titanium tetrachloride;
   (B) a trialkylaluminum compound; and
   (C) a carboxylic ester or a complex thereof with an aluminum halide.

3. The catalyst defined in claim 1 wherein said component (B) additionally includes an alkylaluminum halide compound.

4. The catalyst defined in claim 2 wherein said component (B) additionally includes an alkylaluminum halide compound.

* * * * *